US009627895B2

(12) United States Patent
Tsukamoto

(10) Patent No.: US 9,627,895 B2
(45) Date of Patent: Apr. 18, 2017

(54) POWER SUPPLY APPARATUS, POWER SUPPLY METHOD, AND COMPUTER PROGRAM

(71) Applicant: CANON KABUSHIKI KAISHA, Tokyo (JP)

(72) Inventor: Nobuyuki Tsukamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 436 days.

(21) Appl. No.: 14/376,794

(22) PCT Filed: Sep. 12, 2013

(86) PCT No.: PCT/JP2013/005414
§ 371 (c)(1),
(2) Date: Aug. 5, 2014

(87) PCT Pub. No.: WO2014/054227
PCT Pub. Date: Apr. 10, 2014

(65) Prior Publication Data
US 2014/0375139 A1   Dec. 25, 2014

(30) Foreign Application Priority Data
Oct. 5, 2012 (JP) ................................. 2012-222902

(51) Int. Cl.
*H02J 5/00* (2016.01)
*H04B 5/00* (2006.01)
*H02J 7/02* (2016.01)

(52) U.S. Cl.
CPC .............. *H02J 5/005* (2013.01); *H02J 7/025* (2013.01); *H04B 5/0037* (2013.01); *H04B 5/0075* (2013.01)

(58) Field of Classification Search
CPC ........ H02J 5/005; H02J 7/025; H04B 5/0037; H04B 5/0075
USPC ........................................... 307/104; 320/108
See application file for complete search history.

(56) References Cited

U.S. PATENT DOCUMENTS

| 2011/0140671 A1* | 6/2011 | Kim ................. H02J 7/025 320/137 |
| 2011/0169338 A1* | 7/2011 | Kozakai ................. H02J 5/005 307/104 |

FOREIGN PATENT DOCUMENTS

| CN | 102299548 A | 12/2011 |
| CN | 102315692 A | 1/2012 |
| CN | 102545352 A | 7/2012 |
| JP | 2000-011105 A | 1/2000 |

(Continued)

*Primary Examiner* — Hal Kaplan
*Assistant Examiner* — Elim Ortiz
(74) *Attorney, Agent, or Firm* — Canon USA, Inc. IP Division

(57) ABSTRACT

A power supply apparatus includes a first power supply unit used for a first power supply method, a second power supply unit used for a second power supply method different from the first power supply method, a first communication unit used for a first control method for controlling power supplying, a second communication unit used for a second control method different from the first control method, and a control unit that sets the power supply apparatus in any one of a first, second, and third mode based on authentication with an electronic apparatus. The control unit operates so that the power supply apparatus performs power supply to the electronic apparatus based on a set mode.

19 Claims, 9 Drawing Sheets

(56) References Cited

FOREIGN PATENT DOCUMENTS

| | | | |
|---|---|---|---|
| JP | 2008-295273 | A | 12/2008 |
| JP | 2010-226836 | A | 10/2010 |
| JP | 2010-538596 | A | 12/2010 |
| WO | 2011/011681 | A2 | 1/2011 |

* cited by examiner

POWER SUPPLY APPARATUS, POWER SUPPLY METHOD, AND COMPUTER PROGRAM

TECHNICAL FIELD

The present invention relates to a power supply apparatus that performs wireless power supplying.

BACKGROUND ART

In recent years, a power supply system including a power supply apparatus that performs wireless power supplying by using a primary coil and an electronic apparatus that receives power from the power supply apparatus by using a secondary coil has been known. In such power supply system, the power supply apparatus is known to transmit power to the electronic apparatus by using electromagnetic induction (PTL 1).

CITATION LIST

Patent Literature

PTL 1: Japanese Patent Application Laid-Open No. 2008-295273

SUMMARY OF INVENTION

Technical Problem

Conventionally, when the power supply apparatus is compatible with a plurality of power supply methods, it has not been considered about how the power supply apparatus selects a power supply method. Therefore, since such conventional power supply apparatus cannot select an appropriate power supply method for an electronic apparatus, the power supply apparatus cannot appropriately control power supplying to the electronic apparatus.

Solution to Problem

The present invention is directed to a power supply apparatus that can select a method for appropriately supplying power to an electronic apparatus and for performing the power supply based on the selected method.

A power supply apparatus according to the present invention includes a first power supply unit configured to be used for a first power supply method, a second power supply unit configured to be used for a second power supply method different from the first power supply method, a first communication unit configured to be used for a first control method for controlling power supplying, a second communication unit configured to be used for a second control method different from the first control method, and a control unit configured to set the power supply apparatus in a first mode, a second mode, or a third mode based on authentication with an electronic apparatus. The control unit operates so that the power supply apparatus performs power supply to the electronic apparatus based on a set mode. The first mode is a mode for performing power supplying based on the first power supply method and for controlling power supplying based on the first control method. The second mode is a mode for performing power supplying based on the second power supply method and for controlling power supplying based on the first control method. The third mode is a mode for performing power supplying based on the second power supply method and for controlling power supplying based on the second control method.

DESCRIPTION OF EMBODIMENTS

First Embodiment

Figure 1:
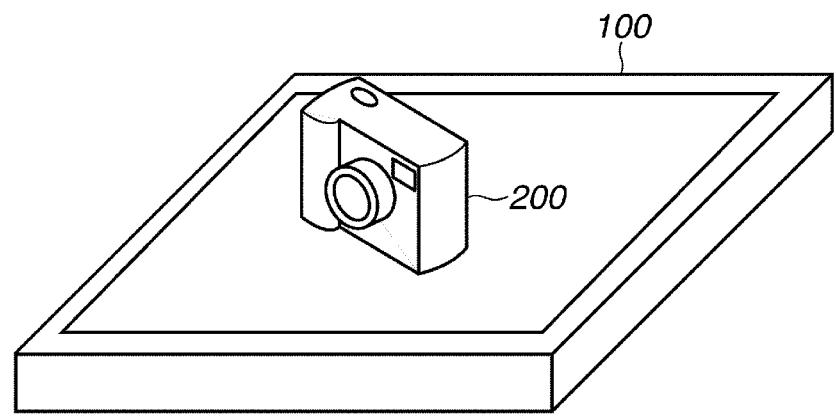
FIG. 1 is a diagram illustrating an example of power supply system according to a first exemplary embodiment.

Next, a first exemplary embodiment of the present invention will be described in detail with reference to the drawings. As illustrated in FIG. 1, a power supply system according to the first exemplary embodiment includes a power supply apparatus 100 and an electronic apparatus 200. In the power supply system according to the first exemplary embodiment, if the distance between the power supply apparatus 100 and the electronic apparatus 200 is within a predetermined range, the power supply apparatus 100 performs wireless power supplying to the electronic apparatus 200. If the distance between the power supply apparatus 100 and the electronic apparatus 200 is within the predetermined range, the electronic apparatus 200 can wirelessly receive power from the power supply apparatus 100. However, if the distance between the power supply apparatus 100 and the electronic apparatus 200 is not within the predetermined range, the electronic apparatus 200 cannot receive power from the power supply apparatus 100. The predetermined range is a range in which the power supply apparatus 100 and the electronic apparatus 200 can communicate with each other. The power supply apparatus 100 may be configured to perform wireless power supplying to a plurality of electronic apparatuses.

The electronic apparatus 200 may be an imaging apparatus such as a digital still camera or a digital video camera, or may be a reproduction apparatus. Alternatively, the electronic apparatus 200 may be a communication apparatus such as a mobile phone or a smartphone. Alternatively, the electronic apparatus 200 may be a battery pack including a battery 209. Alternatively, the electronic apparatus 200 may be an apparatus such as an automobile driven by power supplied from the power supply apparatus 100. Alternatively, the electronic apparatus 200 may be an apparatus that receives television broadcasts, a display that displays video data, or a personal computer. Alternatively, the electronic apparatus 200 may be an apparatus that operates with power supplied from the power supply apparatus 100 even when the battery 209 is not attached to the electronic apparatus. The electronic apparatus 200 may be an external apparatus that operates with power supplied from the power supply apparatus 100.

Figure 2:
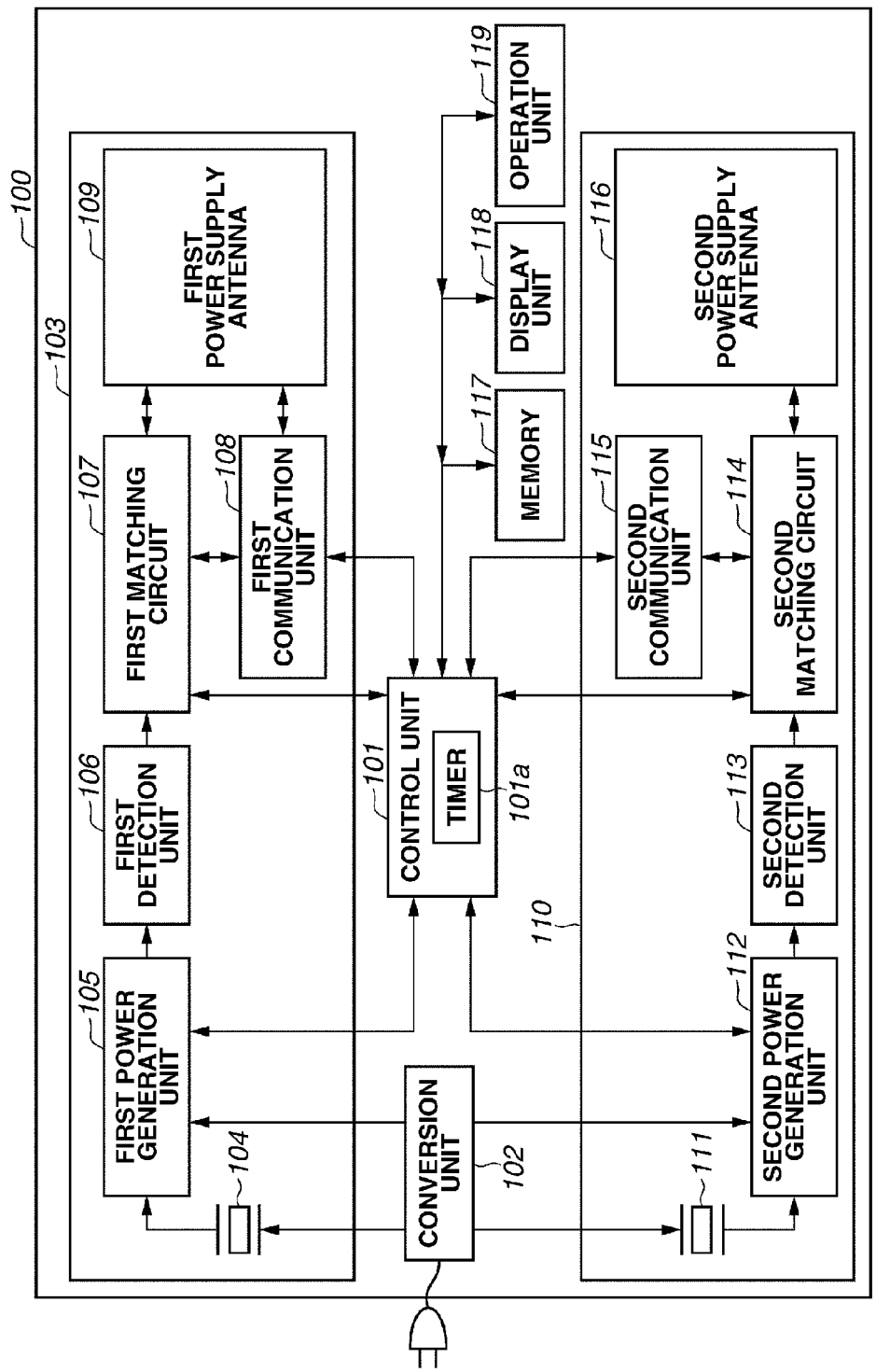
FIG. 2 is a block diagram illustrating an example of a power supply apparatus 100 according to the first exemplary embodiment.

FIG. 2 is a block diagram illustrating an example of the power supply apparatus 100 according to the first exemplary embodiment. As illustrated in FIG. 2, the power supply apparatus 100 includes a control unit 101, a conversion unit 102, a first power supply unit 103, a first oscillator 104, a first power generation unit 105, a first detection unit 106, a first matching circuit 107, a first communication unit 108, and a first power supply antenna 109. In addition, the power supply apparatus 100 includes a second power supply unit 110, a second oscillator 111, a second power generation unit 112, a second detection unit 113, a second matching circuit 114, a second communication unit 115, and a second power supply antenna 116. In addition, the power supply apparatus 100 includes a memory 117, a display unit 118, and an operation unit 119.

The first power supply unit 103 includes the first oscillator 104, the first power generation unit 105, the first detection unit 106, the first matching circuit 107, the first communication unit 108, and the first power supply antenna 109. For example, the first power supply unit 103 is used for performing power supplying based on a magnetic resonance method. The magnetic resonance method is a method used for transmitting power from the power supply apparatus 100 to the electronic apparatus 200 in a state in which the power supply apparatus 100 and the electronic apparatus 200 resonate with each other. The state in which the power supply apparatus 100 and the electronic apparatus 200 resonate with each other is a state in which a resonance frequency of a power supply antenna of the power supply apparatus 100 used for outputting power and a resonance frequency of a power reception antenna of the electronic apparatus 200 used for receiving the power are matched. Compared with the second power supply unit 110, the first power supply unit 106 can perform longer-distance power supplying and communication.

The second power supply unit 110 includes the second oscillator 111, the second power generation unit 112, the second detection unit 113, the second matching circuit 114, the second communication unit 115, and the second power supply antenna 116. For example, the second power supply unit 110 is used for performing power supplying based on the "Qi" standard defined by the Wireless Power Consortium (WPC). The second power supply unit 110 performs power supply by using electromagnetic induction. In addition, the second power supply unit 110 uses a power supply method different from the power supply method used by the first power supply unit 103.

The power supply apparatus 100 according to the first exemplary embodiment can use first and second power supply methods, as the power supply methods for performing power supplying. The first power supply method is a method in which the power supply apparatus 100 performs power supply by using the first power supply unit 103. The second power supply method is a method in which the power supply apparatus 100 performs power supply by using the second power supply unit 110.

In addition, the power supply apparatus 100 according to the first exemplary embodiment can use first and second control methods, as the control methods for controlling power supplying. The first control method is a communication method for controlling power supplying by using the first power supply unit 103. The second control method is a communication method for controlling power supplying by using the second power supply unit 110.

A case where the power supply apparatus 100 performs power supply based on the first power supply method and controls the power supplying based on the first control method will hereinafter be referred to as "a first mode". If the power supply apparatus 100 is set to the first mode, the control unit 101 performs power supply based on the first power supply method and controls the power supplying based on the first control method. In addition, if the power supply apparatus 100 is set to the first mode, the control unit 101 controls the power supply apparatus 100 not to perform power supply using the second power supply unit 110. If the power supply apparatus 100 is set to the first mode, the control unit 101 controls the power supply apparatus 100 not to perform communication using the second power supply unit 110.

A case where the power supply apparatus 100 performs power supply based on the second power supply method and controls the power supplying based on the first control method will hereinafter be referred to as "a second mode". If the power supply apparatus 100 is set to the second mode, the control unit 101 performs power supply based on the second power supply method and controls the power supplying based on the first control method. In addition, if the power supply apparatus 100 is set to the second mode, the control unit 101 controls the power supply apparatus 100 not to perform power supply using the first power supply unit 103. If the power supply apparatus 100 is set to the second mode, the control unit 101 controls the power supply apparatus 100 not to perform communication using the second power supply unit 110.

A case where the power supply apparatus 100 performs power supply based on the second power supply method and controls the power supplying based on the second control method will hereinafter be referred to "a third mode". If the power supply apparatus 100 is set to the third mode, the control unit 101 performs power supply based on the second power supply method and controls the power supplying based on the second control method. If the power supply apparatus 100 is set to the third mode, the control unit 101 controls the power supply apparatus 100 not to perform power supply using the first power supply unit 103. If the power supply apparatus 100 is set to the third mode, the control unit 101 controls the power supply apparatus 100 not to perform communication using the first power supply unit 103. However, if communication other than communication for controlling power supplying is performed, the control unit 101 allows communication by using the first power supply unit 103.

The control unit 101 controls the power supply apparatus 100 by executing a computer program stored in the memory 117. For example, the control unit 101 includes a central processing unit (CPU) or a micro processing unit (MPU). In addition, the control unit 101 includes a timer 101a for measuring time relating to an operation performed in the power supply apparatus 100.

When an alternating-current (AC) power supply (not illustrated) and the power supply apparatus 100 are connected, the conversion unit 102 converts the AC power supplied from the AC power supply (not illustrated) into a direct-current (DC) power and supplies the converted DC power to the power supply apparatus 100. This DC power is supplied from the conversion unit 102 to at least one of the first power supply unit 103 and the second power supply unit 110.

The first oscillator 104 oscillates a frequency used for controlling the first power generation unit 105. The first oscillator 104 includes a crystal resonator, for example.

The first power generation unit 105 generates, based on the power supplied from the conversion unit 102 and the frequency oscillated by the first oscillator 104, power to be output to the outside via the first power supply antenna 109. The first power generation unit 105 generates first power and second power. The first power generated by the first power generation unit 105 is supplied to the first power supply antenna 109 via the first detection unit 106 and the first matching circuit 107. The second power generated by the first power generation unit 105 is supplied to the first power supply antenna 109 via the first detection unit 106 and the first matching circuit 107.

For example, the first power is used for performing wireless communication with the electronic apparatus 200 via the first power supply antenna 109 based on a predetermined communication method. The predetermined communication method corresponds to NFC standards defined by the Near Field Communication (NFC) Forum, for example. The NFC standards may be International Organization for Standardization/International Electrotechnical Commission (ISO/IEC) 18092 standards, ISO/IEC 14443 standards, or ISO/IEC 21481 standards, for example. The first power is a power of 1 W or less, for example. The first power is not limited to a power of 1 W or less, and an arbitrary level of power may be used, as long as the first power can be used by the power supply apparatus 100 for performing wireless communication based on the NFC standards.

The second power is used for causing the electronic apparatus 200 to perform charging or a predetermined operation. The following description will be made assuming that the power supply apparatus 100 cannot perform wireless communication based on the NFC standards via the first power supply antenna 109 if the second power is output via the first power supply antenna 109. In addition, the second power is a power of 2 W or more, for example. Alternatively, the second power is not limited to a power of 2 W or more. Namely, an arbitrary level of power may be used, as long as the second power is larger than the first power.

Figure 3:
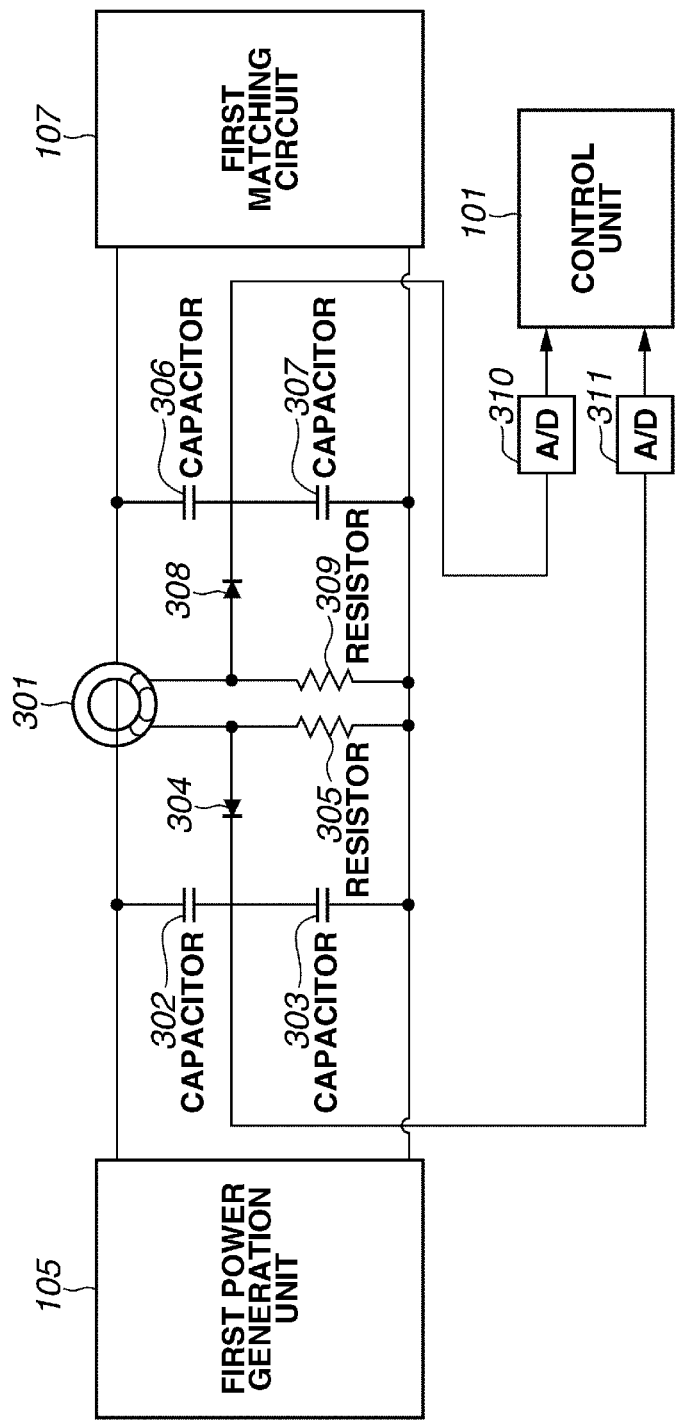
FIG. 3 is a diagram illustrating an example of a first detection unit 106 according to the first exemplary embodiment.

Next, the first detection unit 106 will be described. FIG. 3 illustrates an example of the first detection unit 106. As illustrated in FIG. 3, the first detection unit 106 includes a toroidal core 301, a capacitor 302, a capacitor 303, a diode 304, a resistor 305, a capacitor 306, a capacitor 307, a diode 308, and a resistor 309. In addition, the first detection unit 106 includes analog-to-digital (A/D) converters 310 and 311.

The first detection unit 106 uses CM (i.e., inductive coupling and capacitive coupling) coupling to detect the traveling wave of the power output by the first power supply antenna 109 as a voltage of the capacitor 307. In addition, the A/D converter 310 of the first detection unit 106 converts the detected voltage of the capacitor 307 from an analog value to a digital value and supplies the digital value to the control unit 101. The first detection unit 106 uses CM coupling to detect the reflected wave of the power output by the first power supply antenna 109 as a voltage of the capacitor 303. The A/D converter 311 of the first detection unit 106 converts the detected voltage of the capacitor 303 from an analog value to a digital value and supplies the digital value to the control unit 101. In the first detection unit 106, the toroidal core 301 makes inductive coupling and the capacitors 302 and 306 make capacitive coupling. The first detection unit 106 is used for determining whether the electronic apparatus 200 exists near the power supply apparatus 100.

The control unit 101 detects the voltage supplied from the A/D converter 310 as the amplitude voltage V1 of the traveling wave and the voltage supplied from the A/D converter 311 as the amplitude voltage V2 of the reflected wave. The control unit 101 detects a voltage reflection coefficient P, based on the amplitude voltage V1, the amplitude voltage V2, and the following mathematical expression (1). The following mathematical expression (1) represents the voltage reflection coefficient P.

$$P = V2/V1 \quad (1)$$

In addition, the control unit 101 regularly detects a voltage standing wave ratio (VSWR), based on the voltage reflection coefficient rho and the following mathematical expression (2). The following mathematical expression (2) represents the voltage standing wave ratio VSWR.

$$VSWR = (1+P)/(1-P) \quad (2)$$

The voltage standing wave ratio VSWR detected based on the traveling and reflected waves of the power output by the first power supply antenna 109 will hereinafter be referred to as "VSWR". VSWR is a value indicating a relationship between the traveling wave and the reflected wave of the power output by the first power supply antenna 109. The closer to 1 the value of the VSWR is, the smaller the reflected wave is and the less the loss of the power supplied from the power supply apparatus 100 to the electronic apparatus 200, which indicates good power transmission efficiency. The control unit 101 uses the VSWR to determine whether the electronic apparatus 200 exists near the power supply apparatus 100.

The first matching circuit 107 is a resonance circuit for causing resonance between the first power supply antenna 109 and a power reception antenna of the electronic apparatus 200. The first matching circuit 107 sets a resonance frequency of the first power supply antenna 109. The first matching circuit 107 includes a circuit for causing impedance matching between the first power generation unit 105 and the first power supply antenna 109. If the power supply apparatus 100 outputs the first power or the second power via the first power supply antenna 109, the control unit 101 controls the first matching circuit 107 so that the resonance frequency of the first power supply antenna 109 matches a first frequency. For example, the first frequency may be 13.56 megahertz (MHz) or 6.78 MHz. Alternatively, the first frequency may be tens of MHz. Alternatively, the first frequency may be a frequency defined by the NFC standards. If the first matching circuit 107 sets the resonance frequency of the first power supply antenna 109 so that the resonance frequency matches the first frequency, the first matching circuit 107 supplies any one of the first power and the second power to the first power supply antenna 109.

The first communication unit 108 performs wireless communication based on the NFC standards. The first communication unit 108 has a reader/writer mode and a target mode as communication modes. The target mode may alternatively be referred to as "a peer-to-peer (P2P) target mode".

Next, a case where the first communication unit 108 is in the reader/writer mode will be described. If the power supply apparatus 100 outputs the first power via the first power supply antenna 109, the first communication unit 108 superimposes first predetermined data on the first power supplied from the first power generation unit 105 and supplies the first power to the first power supply antenna 109. The first power on which the first predetermined data has been superimposed is output to the outside via the first power supply antenna 109. In this way, the first predetermined data is transmitted to the electronic apparatus 200. To generate a pulse signal corresponding to the first predetermined data, the first communication unit 108 performs amplitude shift keying (ASK) modulation on the first power. The ASK modulation is a modulation using shifting in amplitude. If the ASK modulation is performed on the first power, the first power on which a pulse signal corresponding to the first predetermined data has been superimposed is transmitted to the electronic apparatus 200 via the first power supply antenna 109. If the electronic apparatus 200 receives the first predetermined data, the electronic apparatus 200 transmits the first response data corresponding to the first predetermined data. By performing load modulation on the first power output from the power supply apparatus 100, the electronic apparatus 200 transmits the first response data to the power supply apparatus 100. If the electronic apparatus 200 performs the load modulation, a current flowing through the first power supply antenna 109 changes. Thus, the first communication unit 108 detects the current flowing through the first power supply antenna 109 and receives the first response data from the electronic apparatus 200 based on the detected current flowing through the first power supply antenna 109. The first predetermined data corresponds to the NFC Data Exchange Format (NDEF) defined by the NFC standards. In addition, the first response data is compatible with the NDEF.

Next, a case where the first communication unit 108 is in the target mode will be described. If the first communication unit 108 receives second predetermined data via the first power supply antenna 109, the first communication unit 108 analyzes the second predetermined data based on the NFC standards and supplies the result of the analysis of the second predetermined data to the control unit 101. While the power supply apparatus 100 is receiving fourth power from the electronic apparatus 200 via the first power supply antenna 109, if the first communication unit 108 receives the second predetermined data, the control unit 101 transmits second response data corresponding to the second predetermined data to the electronic apparatus 200. In this case, the control unit 101 controls the first communication unit 108 to perform load modulation so that the second response data is transmitted to the power supply apparatus 100. In this case, the first communication unit 108 changes load included in the first communication unit 206 based on the second response data to be transmitted to the power supply apparatus 100.

The first power supply antenna 109 is an antenna for outputting the first power or the second power to the electronic apparatus 200. The first power supply antenna 109 is used for receiving the fourth power from the electronic apparatus 200. The first power supply antenna 109 is used for transmitting the first predetermined data. In addition, the first power supply antenna 109 is used for receiving the first response data. The first power supply antenna 109 is used for receiving the second predetermined data. In addition, the first power supply antenna 109 is used for transmitting the second response data.

The second oscillator 111 oscillates a frequency used for controlling the second power generation unit 112. The second oscillator 111 includes a crystal resonator, for example.

The second power generation unit 112 generates power to be output to the outside via the second power supply antenna 116, based on the power supplied from the conversion unit 102 and the frequency oscillated by the second oscillator 111. The second power generation unit 112 generates third power. The third power generated by the second power generation unit 112 is supplied to the second power supply antenna 116 via the second detection unit 113 and the second matching circuit 114. The third power is used for causing the electronic apparatus 200 to perform charging or a predetermined operation. For example, the third power is a power of 5 W. However, the third power is not limited to a power of 5 W. For example, the third power may be less than a power of 5 W, as long as the third power is larger than the first power. The third power may be power defined by the Qi standard.

The second detection unit 113 is used for determining whether the electronic apparatus 200 exists near the power supply apparatus 100. The second detection unit 113 determines whether the electronic apparatus 200 exists near the power supply apparatus 100 by performing selection process and ping process.

The selection process is for detecting a resonance frequency of the second power supply antenna 116 and determining whether the electronic apparatus 200 exists near the power supply apparatus 100 based on change of the resonance frequency of the second power supply antenna 116. In addition, the selection process may be for detecting capacitance of a surface of an interface on which the second power supply antenna 116 is installed and determining whether the electronic apparatus 200 exists near the power supply apparatus 100 based on the detected change of the capacitance. If the second detection unit 113 detects presence of the electronic apparatus 200 through the selection process, the second detection unit 113 performs the ping process.

The ping process is for detecting the electronic apparatus 200 by using a digital ping and identifying the electronic apparatus 200. The second detection unit 113 outputs a digital ping for identifying the electronic apparatus 200 via the second power supply antenna 116. The digital ping is a power signal for detecting a power reception apparatus that receives power and identifying the power reception apparatus.

The second matching circuit 114 is a resonance circuit for causing resonance between the second power supply antenna 116 and a power reception antenna of the electronic apparatus 200. The second matching circuit 114 sets a resonance frequency of the second power supply antenna 116. The second matching circuit 114 includes a circuit for performing impedance matching between the second power generation unit 112 and the second power supply antenna 116. If the power supply apparatus 100 outputs the third power via the second power supply antenna 116, the control unit 101 controls the second matching circuit 114 so that the resonance frequency of the second power supply antenna 116 matches a second frequency. For example, the second frequency may be a frequency between 100 KHz and 205 KHz. Alternatively, the second frequency may be a frequency defined by the Qi standard. The second frequency is lower than the first frequency. If the second matching circuit 114 sets the resonance frequency of the second power supply antenna 116 so that the resonance frequency matches the second frequency, the second matching circuit 114 supplies the third power to the second power supply antenna 116.

The second communication unit 115 receives third predetermined data via the second power supply antenna 116. The third predetermined data is data defined by the Qi standard. If the second communication unit 115 receives the third predetermined data, the control unit 201 transmits third response data corresponding to the third predetermined data to the power supply apparatus 100. The second communication unit 115 performs wireless communication with the electronic apparatus 200 based on the Qi standard.

The second power supply antenna 116 is an antenna for outputting the third power to the electronic apparatus 200. The second power supply antenna 116 is used for receiving the third predetermined data. In addition, the second power supply antenna 116 is used for transmitting the third response data corresponding to the third predetermined data.

The memory 117 stores a computer program for controlling the power supply apparatus 100 and parameters relating to the power supply apparatus 100. In addition, the memory 117 stores data supplied from the electronic apparatus 200.

The display unit 118 displays video data supplied from the memory 117.

The operation unit 119 provides a user interface for operating the power supply apparatus 100. For example, the operation unit 119 includes buttons, switches, or a touch panel for operating the power supply apparatus 100. The control unit 101 controls the power supply apparatus 100 in accordance with an input signal input via the operation unit 119.

Next, a configuration of the electronic apparatus 200 according to the first exemplary embodiment will be described with reference to FIG. 4. The electronic apparatus 200 includes a control unit 201, a first power reception unit 202, a first power reception antenna 203, a first matching circuit 204, a first rectifier and smoothing circuit 205, and a first communication unit 206. In addition, the electronic apparatus 200 includes a regulator 207, a charge control unit 208, the battery 209, a memory 210, and an operation unit 211.

The control unit 201 controls the electronic apparatus 200 by executing a computer program stored in the memory 210. For example, the control unit 201 includes a CPU or an MPU.

The first power reception unit 202 includes the first power reception antenna 203, the first matching circuit 204, the first rectifier and smoothing circuit 205, and the first communication unit 206. For example, the first power reception unit 202 is used for receiving power based on a magnetic resonance method. The first power reception unit 202 corresponds to the first power supply unit 103.

The first power reception antenna 203 is an antenna for receiving any one of the first power and the second power from the power supply apparatus 100. The first power reception antenna 203 is used for receiving the first predetermined data. In addition, the first power reception antenna 203 is used for transmitting the first response data. The first power reception antenna 203 is used for transmitting the second predetermined data. In addition, the first power reception antenna 203 is used for receiving the second response data.

The first matching circuit 204 is a resonance circuit for causing resonance between the first power reception antenna 203 and the first power supply antenna 109 of the power supply apparatus 100. The first matching circuit 204 sets a resonance frequency of the first power reception antenna 203. If the electronic apparatus 200 receives power from the power supply apparatus 100 via the first power reception antenna 203, the control unit 201 controls the first matching circuit 204 so that the resonance frequency of the first power reception antenna 203 matches the first frequency. If the first matching circuit 204 sets the resonance frequency of the first power reception antenna 203 so that the resonance frequency matches the first frequency, the power received via the first power reception antenna 203 is supplied to the first rectifier and smoothing circuit 205 via the first matching circuit 204.

The first rectifier and smoothing circuit 205 removes (extracts) the first predetermined data from the power supplied from the first matching circuit 204 and generates DC power. In addition, the first rectifier and smoothing circuit 205 supplies the generated DC power to the regulator 207. The first rectifier and smoothing circuit 205 supplies the first predetermined data, which has been extracted from the power supplied from the first power reception antenna 203, to the first communication unit 206.

The first communication unit 206 performs wireless communication with the power supply apparatus 100 based on the NFC standards. The first communication unit 206 includes a card emulation mode and an initiator mode, as communication modes. The initiator mode may alternatively be called "a P2P initiator mode".

Next, a case where the first communication unit 206 is in the card emulation mode will be described. If the first communication unit 206 receives the first predetermined data via the first power reception antenna 203, the first communication unit 206 analyzes the first predetermined data supplied from the first rectifier and smoothing circuit 205 based on the NFC standards. In addition, the first communication unit 206 supplies the result of the analysis of the first predetermined data to the control unit 201. While the electronic apparatus 200 is receiving power from the power supply apparatus 100 via the first power reception antenna 203, if the first communication unit 206 receives the first predetermined data, the control unit 201 transmits the first response data to the power supply apparatus 100. In this case, the control unit 201 controls the first communication unit 206 to perform load modulation so that the first response data is transmitted to the power supply apparatus 100. In this case, the first communication unit 206 changes load included in the first communication unit 206 based on the first response data to be transmitted to the power supply apparatus 100.

Next, a case where the first communication unit 206 is in the initiator mode will be described. The first communication unit 206 superimposes the second predetermined data on the fourth power supplied from the regulator 207 and supplies the power to the first power reception antenna 203. The fourth power on which the second predetermined data has been superimposed is output to the outside via the first power reception antenna 203. In this way, the second predetermined data is transmitted to the power supply apparatus 100. To generate a pulse signal corresponding to the second predetermined data, the first communication unit 206 performs ASK modulation. If the ASK modulation is performed on the fourth power, the fourth power on which a pulse signal corresponding to the second predetermined data has been superimposed is transmitted to the power supply apparatus 100 via the first power reception antenna 203. If the power supply apparatus 100 receives the second predetermined data, the power supply apparatus 100 transmits the second response data corresponding to the second predetermined data. The first communication unit 206 detects a current flowing through the first power reception antenna 203 and receives the second response data transmitted from the power supply apparatus 100 based on the detected current flowing through the first power reception antenna 203. The second predetermined data is compliant with the NDEF and the second response data is compliant with the NDEF.

The fourth power is used for performing wireless communication with the power supply apparatus 100 via the first power reception antenna 203 based on the NFC standards, for example. Arbitrary power may be used as the fourth power, as long as the electronic apparatus 200 can perform wireless communication based on the NFC standards by using the fourth power.

The control unit 201 controls the regulator 207 so that power is supplied to the electronic apparatus 200 from any one of the first rectifier and smoothing circuit 205 and the battery 209. The regulator 207 supplies power supplied from the first rectifier and smoothing circuit 205 to the electronic apparatus 200, in accordance with an instruction from the control unit 201. In accordance with an instruction from the control unit 201, the regulator 207 supplies discharged power supplied from the battery 209 to the electronic apparatus 200 via the charge control unit 208.

The charge control unit 208 charges the battery 209 by using the power supplied from the regulator 207. In addition, if power is discharged from the battery 209, the charge control unit 208 supplies the discharged power supplied from the battery 209 to the regulator 207. The charge control unit 208 regularly detects information about the remaining capacity of the battery 209 and information about charging of the battery 209, and notifies the control unit 201 of the detected information.

The battery 209 is a battery that can be attached to and detached from the electronic apparatus 200. In addition, the battery 209 is a rechargeable secondary battery such as a lithium-ion battery. Alternatively, the battery 209 may be a battery other than a lithium-ion battery.

The memory 210 stores a computer program for controlling the electronic apparatus 200. In addition, the memory 210 stores information about the electronic apparatus 200 and data received from the power supply apparatus 100, for example.

The operation unit 211 provides a user interface for operating the electronic apparatus 200. For example, the operation unit 211 includes buttons, switches, or a touch panel for operating the electronic apparatus 200. The control unit 201 controls the electronic apparatus 200 in accordance with an input signal input via the operation unit 211.

The power supply apparatus 100 is configured to supply power to the electronic apparatus 200 wirelessly. However, "wirelessly" may alternatively be referred to as "in a non-contact manner".

<Authentication Process>

Next, authentication process performed by the power supply apparatus 100 according to the first exemplary embodiment will be described with reference to a flowchart in FIG. 5. The authentication process can be performed by causing the control unit 101 to execute a computer program stored in the memory 117. When the power supply apparatus 100 supplies power to the electronic apparatus 200, the control unit 101 performs the authentication process illustrated in FIG. 5 for selecting a power supply method and a control method. The following description will be made assuming that, when the control unit 101 performs the authentication process in FIG. 5, the first communication unit 108 is in the reader/writer mode.

Figure 5:
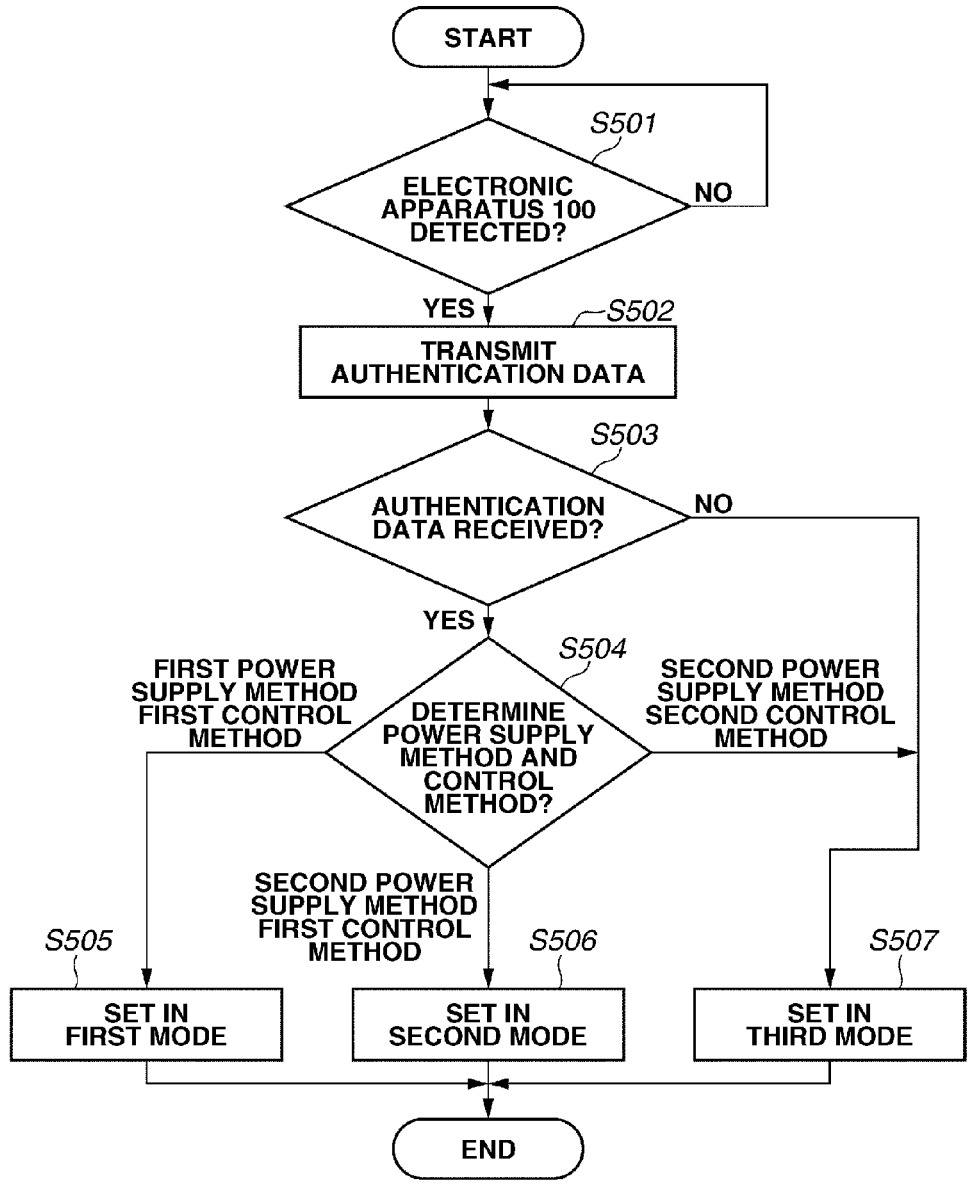
FIG. 5 is a flowchart illustrating an example of authentication process performed by the power supply apparatus 100 according to the first exemplary embodiment.

In addition, when the power supply apparatus 100 performs the authentication process in FIG. 5, the power supply apparatus 100 detects a power supply method of the electronic apparatus 200 by using the first power supply unit 103. In addition, when the power supply apparatus 100 performs the authentication process in FIG. 5, the power supply apparatus 100 detects a control method of the electronic apparatus 200 by using the first power supply unit 103. Thus, when the power supply apparatus 100 performs the authentication process in FIG. 5, the control unit 101 controls the first matching circuit 107 so that the resonance frequency of the first power supply antenna 109 is set to 13.56 MHz. In addition, in this case, the control unit 101 controls the first power supply unit 103 so that the first power is output via the first power supply antenna 109. In addition, in this case, the control unit 101 may control the electronic apparatus 200 so that the resonance frequency of the first power reception antenna 203 is set to 13.56 MHz. In this case, the third power is not output via the second power supply antenna 116.

In step S501, the control unit 101 determines whether the electronic apparatus 200 exists near the power supply apparatus 100. For example, the control unit 101 uses the VSWR detected by the first detection unit 106 to determine whether the electronic apparatus 200 exists near the power supply apparatus 100.

If the VSWR has changed by a first predetermined value or more (YES in step S501), the control unit 101 determines that the electronic apparatus 200 exists near the power supply apparatus 100. In this case, the process proceeds from step S501 to step S502. If the VSWR has not changed by the first predetermined value or more (NO in step S501), the control unit 101 determines that the electronic apparatus 200 does not exist near the power supply apparatus 100. In this case, the control unit 101 waits until the electronic apparatus 200 is detected. The first predetermined value is any value between 0.8 and 2.0.

In step S502, the control unit 101 controls the first communication unit 108 to transmit authentication data to the electronic apparatus 200 via the first power supply antenna 109. The authentication data includes information for performing authentication between the power supply apparatus 100 and the electronic apparatus 200. The authentication data is used for detecting a power supply method and a control method that the electronic apparatus 200 can use. The authentication data is used for performing authentication for power supplying between the power supply apparatus 100 and the electronic apparatus 200.

The control unit 101 uses the authentication data to detect whether the electronic apparatus 200 is compatible with the first power supply method or the second power supply method and to determine whether the electronic apparatus 200 is compatible with the first control method or the second control method. After the first communication unit 108 transmits the authentication data, the process proceeds from step S502 to step S503.

If the electronic apparatus 200 receives the authentication data, the control unit 201 determines whether the electronic apparatus 200 is compatible with the first power supply method or the second power supply method. In addition, the control unit 201 determines whether the electronic apparatus 200 is compatible with the first control method or the second control method. In this case, based on a result of the determination, the control unit 201 controls the first communication unit 206 to transmit the first response data corresponding to the authentication data to the power supply apparatus 100 via the first power reception antenna 203. The first response data corresponding to the authentication data includes Text Record Type Definition (RTD) defined by the NFC standards. The Text RTD includes a first field indicating a power supply method of the electronic apparatus 200 and a second field indicating a control method of the electronic apparatus 200.

If the control unit 201 determines that the electronic apparatus 200 is compatible with the first power supply method, the control unit 201 writes data which indicates that the electronic apparatus 200 is compatible with the first power supply method in the first field in the first response data. For example, the control unit 201 writes character data indicating NFC in the first field.

If the control unit 201 determines that the electronic apparatus 200 is compatible with the second power supply method, the control unit 201 writes data which indicates that the electronic apparatus 200 is compatible with the second power supply method in the first field of the first response data. For example, the control unit 201 writes character data indicating Qi in the first field.

If the control unit 201 determines that the electronic apparatus 200 is compatible with the first control method, the control unit 201 writes data which indicates that the electronic apparatus 200 is compatible with the first control method in the second field of the first response data. For example, the control unit 201 writes character data indicating NFC in the second field.

If the control unit 201 determines that the electronic apparatus 200 is compatible with the second control method, the control unit 201 writes data which indicates that the electronic apparatus 200 is compatible with the second control method in the second field of the first response data. For example, the control unit 201 writes character data indicating Qi in the second field.

Figure 4:
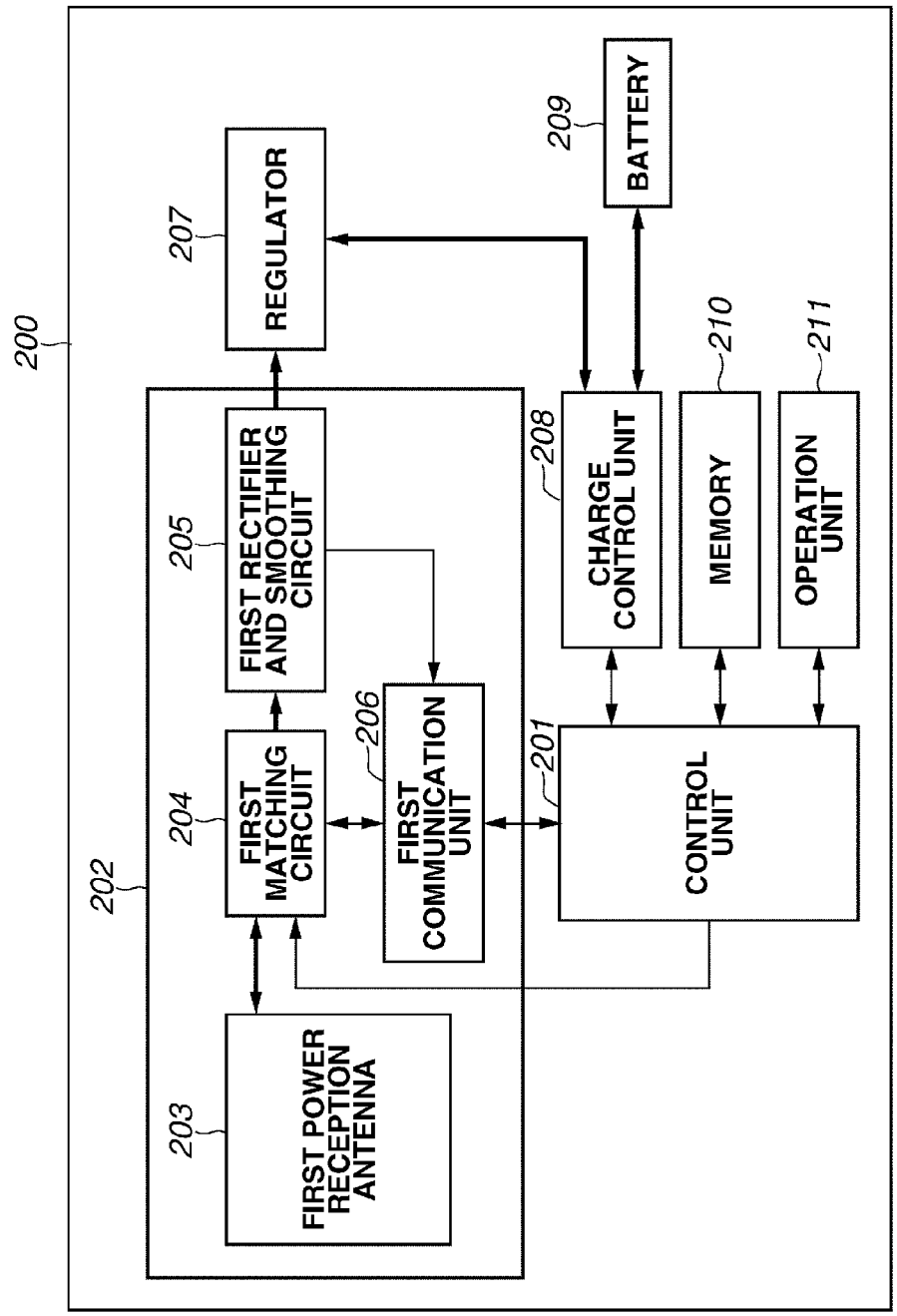
FIG. 4 is a block diagram illustrating an example of an electronic apparatus 200 according to the first exemplary embodiment.

The following description will be made assuming that the electronic apparatus 200 illustrated in FIG. 4 is compatible with the first power supply method and the first control method but not the second power supply method and the second control method.

In step S503, the control unit 101 determines whether the first communication unit 108 has received the first response data corresponding to the authentication data. If the control unit 101 determines that the first communication unit 108 has received the first response data corresponding to the authentication data (YES in step S503), the process proceeds from step S503 to step S504. The first response data corresponding to the authentication data received by the first communication unit 108 is supplied from the first communication unit 108 to the control unit 101. If the control unit 101 determines that the first communication unit 108 has not received the first response data corresponding to the authentication data (NO in step S503), the process proceeds from step S503 to step S507.

In step S504, the control unit 101 uses the first response data corresponding to the authentication data to determine a power supply method and a control method of the electronic apparatus 200. If the control unit 101 determines that the electronic apparatus 200 is compatible with the first power supply method and the first control method, the process proceeds from step S504 to step S505. If the control unit 101 determines that the electronic apparatus 200 is compatible with the second power supply method and the second control method, the process proceeds from step S504 to step S506. If the control unit 101 determines that the electronic apparatus 200 is compatible with the second power supply method and the second control method, the process proceeds from step S504 to step S507.

In step S505, the control unit 101 sets the power supply apparatus 100 in the first mode, performs first power supply processing to be described below, and ends the process of the flowchart.

In step S506, the control unit 101 sets the power supply apparatus 100 in the second mode, performs second power supply processing to be described below, and ends the process of the flowchart.

In step S507, the control unit 101 sets the power supply apparatus 100 in the third mode, performs third power supply process to be described below, and ends the process of the flowchart.

In the above description, when the power supply apparatus 100 performs the authentication process in FIG. 5, the control unit 101 controls the first matching circuit 107 so that the resonance frequency of the first power supply antenna 109 is set to 13.56 MHz. However, it is not limited thereto. For example, the control unit 101 may control the first matching circuit 107 so that the resonance frequency of the first power supply antenna 109 is set to a frequency for performing communication that is complied with the NFC standards when the power supply apparatus 100 performs the authentication process in FIG. 5.

<First Power Supply Process>

Next, the first power supply process performed by the power supply apparatus 100 according to the first exemplary embodiment will be described with reference to a flowchart in FIG. 6. The power supply apparatus 100 can perform the first power supply process by causing the control unit 101 to execute a computer program stored in the memory 117. When set in the first mode, the power supply apparatus 100 performs the first power supply process illustrated in FIG. 6. The power supply apparatus 100 performs the first power supply process when the electronic apparatus 200 illustrated in FIG. 4 exists near the power supply apparatus 100. The following description will be made assuming that, when the power supply apparatus 100 performs the first power supply process in FIG. 6, the first communication unit 108 is in the reader/writer mode.

Figure 6:
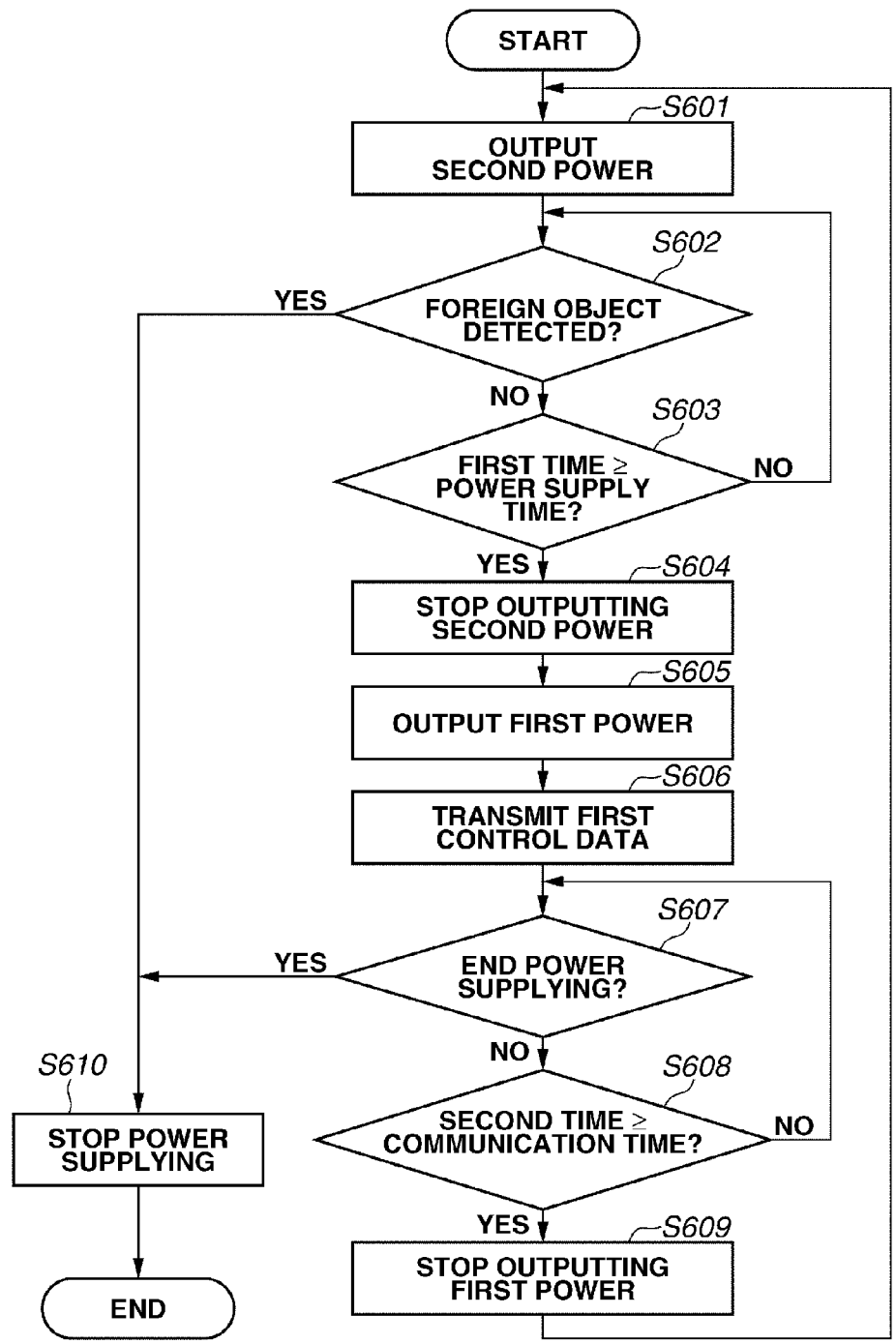
FIG. 6 is a flowchart illustrating an example of first power supply process performed by the power supply apparatus 100 according to the first exemplary embodiment.

When the power supply apparatus 100 performs the first power supply process in FIG. 6, the control unit 101 controls the first matching circuit 107 so that the resonance frequency of the first power supply antenna 109 is set to the first frequency. Alternatively, in this case, the control unit 101 may control the electronic apparatus 200 so that the resonance frequency of the first power reception antenna 203 is set to the first frequency. The following description will be made assuming that the power supply apparatus 100 does not output the third power via the second power supply antenna 116 when performing the first power supply process in FIG. 6.

In step S601, the control unit 101 controls the first power supply unit 103 to output the second power via the first power supply antenna 109. In addition, the control unit 101 controls the timer 101a to measure first time, which indicates the time that has elapsed after output of the second power is started. In step S601, the second power output from the first power supply antenna 109 may be set in advance or may be set by the control unit 101 depending on a state of the electronic apparatus 200. After the first power supply unit 103 outputs the second power, the process proceeds from step S601 to step S602.

In step S602, the control unit 101 determines whether a foreign object exists near the power supply apparatus 100. For example, the control unit 101 uses the VSWR detected by the first detection unit 106 to determine whether a foreign object exists near the power supply apparatus 100.

If the VSWR has changed by a second predetermined value or more (YES in step S602), the control unit 101 determines that a foreign object exists near the power supply apparatus 100. In this case, the process proceeds from step S602 to step S610. On the other hand, if the VSWR has not changed by the second predetermined value or more (NO in step S602), the control unit 101 determines that no foreign object exists near the power supply apparatus 100. In this case, the process proceeds from step S602 to step S603. The second predetermined value is a larger value than the first predetermined value. More specifically, the second predetermined value is any value between 2.5 and 4.0.

In step S603, the control unit 101 determines whether the first time measured by the timer 101a has reached a power supply time or more. If the control unit 101 determines that the first time has reached the power supply time or more (YES in step S603), the process proceeds from step S603 to step S604. If the control unit 101 determines that the first time has not reached the power supply time or more (NO in step S603), the process returns from step S603 to step S602. The power supply time is the time length during which the second power is output. The power supply time may be determined in advance or may be set by the control unit 101 depending on the state of the electronic apparatus 200. The control unit 101 controls the first power supply unit 103 to output the second power via the first power supply antenna 109 until the first time reaches the power supply time or more.

In step S604, the control unit 101 controls the first power supply unit 103 to stop outputting the second power. Accordingly, the first power supply unit 103 stops outputting the second power via the first power supply antenna 109. Next, the process proceeds from step S604 to step S605.

In step S605, the control unit 101 controls the first power supply unit 103 to output the first power via the first power supply antenna 109. In addition, after controlling the timer 101a to reset the time measured thereby, the control unit 101 controls the timer 101a to measure second time, which indicates the time that has elapsed after output of the first power is started. The first power output from the first power supply antenna 109 in step S605 may be determined in advance or may be set by the control unit 101 depending on the state of the electronic apparatus 200. After the first power supply unit 103 outputs the first power, the process proceeds from step S605 to step S606.

In step S606, the control unit 101 controls the first communication unit 108 to transmit first control data to the electronic apparatus 200 via the first power supply antenna 109. The first control data is used for controlling power supplying to the electronic apparatus 200. For example, the first control data is used for requesting the electronic apparatus 200 to transmit data indicating the state of the electronic apparatus 200. The data indicating the state of the electronic apparatus 200 includes at least one of data indicating an operation of the electronic apparatus 200, data indicating power consumption of the electronic apparatus 200, data indicating the remaining capacity of the battery 209, and data indicating a value of the power received by the electronic apparatus 200 from the power supply apparatus 100.

If the first communication unit 108 receives first response data corresponding to the first control data from the electronic apparatus 200 via the first power supply antenna 109, the control unit 101 detects the state of the electronic apparatus 200 based on the first response data corresponding to the first control data. In addition, the control unit 101 controls power supplying to the electronic apparatus 200 based on the detected state of the electronic apparatus 200.

After the first communication unit 108 transmits the first control data, the process proceeds from step S606 to step S607.

In step S607, the control unit 101 determines whether to end the power supplying. For example, after a predetermined time has elapsed after the first communication unit 108 transmits the first control data, if the first communication unit 108 does not receive the first response data corresponding to the first control data, the control unit 101 determines that the power supplying needs to be ended. On the other hand, if the first communication unit 108 receives the first response data corresponding to the first control data within the predetermined time after the first communication unit 108 has transmitted the first control data, the control unit 101 determines that the power supplying needs to be continued.

Alternatively, for example, if the first communication unit 108 receives data indicating an error, the control unit 101 determines that the power supplying needs to be ended. If the first communication unit 108 does not receive such data indicating an error, the control unit 101 determines that the power supplying needs to be continued.

On the other hand, for example, if the first communication unit 108 receives request data, the control unit 101 determines that the power supplying needs to be ended. The request data includes information for requesting stopping of the power supplying. If the first communication unit 108 does not receive the request data, the control unit 101 determines that the power supplying needs to be continued If the control unit 101 determines that the power supplying needs to be ended (YES in step S607), the process proceeds from step S607 to step S610. If the control unit 101 determines that the power supplying needs to be continued (NO in step S607), the process proceeds from step S607 to step S608.

In step S608, the control unit 101 determines whether the second time measured by the timer 101a has reached a communication time or more. If the control unit 101 determines that the second time has reached the communication time or more (YES in step S608), the process proceeds from step S608 to step S609. If the control unit 101 determines that the second time has not reached the communication time or more (NO in step S608), the process returns from step S608 to step S607. The communication time is the time length during which the first power is output. The communication time may be determined in advance or may be set by the control unit 101 depending on the state of the electronic apparatus 200. The control unit 101 controls the first power supply unit 103 to output the first power via the first power supply antenna 109 until the second time reaches the communication time or more.

In step S609, the control unit 101 controls the first power supply unit 103 to stop outputting the first power. Accordingly, the first power supply unit 103 stops outputting the first power via the first power supply antenna 109. Next, the process returns from step S609 to step S601.

In step S610, the control unit 101 controls the first power supply unit 103 to stop outputting the power. Namely, the control unit 101 controls the first power supply unit 103 to stop outputting the first power and the second power via the first power supply antenna 109 and ends the process.

According to the above description, while the control unit 101 controls the first power supply unit 103 to stop outputting the power in step S610 of the first power supply process in FIG. 6, it is not limited thereto. For example, in step S610, the control unit 101 may control the first power supply unit 103 to reduce the power output via the first power supply antenna 109.

Alternatively, for example, in step S610, the control unit 101 may control the first power supply unit 103 to stop outputting the second power via the first power supply antenna 109. In such a case, the control unit 101 may allow outputting the first power via the first power supply antenna 109 to allow communication complying with the NFC standards.

Figure 7:
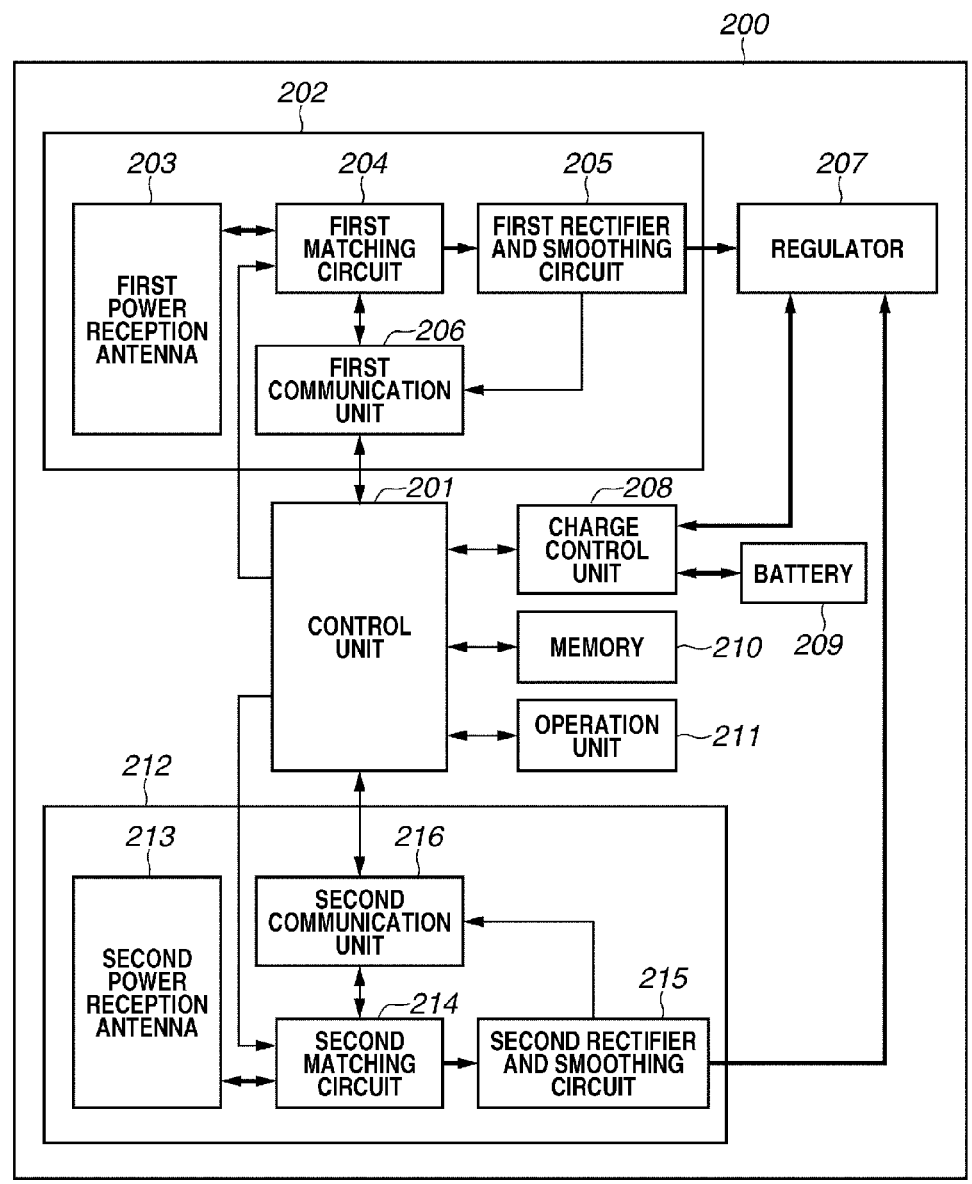
FIG. 7 is a block diagram illustrating an example of the electronic apparatus 200 according to the first exemplary embodiment.

FIG. 7 illustrates another example configuration of the electronic apparatus 200. Since the electronic apparatus 200 in FIG. 7 includes the same components as those of the electronic apparatus 200 in FIG. 4, redundant description thereof will be avoided. Components different from those of the electronic apparatus 200 in FIG. 4 will hereinafter be described.

In addition to the components in FIG. 4, the electronic apparatus 200 in FIG. 7 includes a second power reception unit 212, a second power reception antenna 213, a second matching circuit 214, a second rectifier and smoothing circuit 215, and a second communication unit 216.

The second power reception unit 212 includes the second power reception antenna 213, the second matching circuit 214, the second rectifier and smoothing circuit 215, and the second communication unit 216.

For example, the second power reception unit 212 is used for receiving power based on the Qi standard defined by the WPC. The second power reception unit 212 receives power by using electromagnetic induction. The second power reception unit 212 corresponds to the second power supply unit 110. In addition, the second power reception unit 212 uses a power supply method different from the power supply method used by the first power reception unit 202.

The second power reception antenna 213 is an antenna for receiving the third power from the power supply apparatus 100. The second power reception antenna 213 is used for transmitting the third predetermined data. The second power reception antenna 213 is used for receiving the third response data corresponding to the third predetermined data.

The second matching circuit 214 is a resonance circuit for causing resonance between the second power reception antenna 213 and the second power supply antenna 116 of the power supply apparatus 100. The second matching circuit 204 sets a resonance frequency of the second power reception antenna 213. If the electronic apparatus 200 receives power from the power supply apparatus 100 via the second power reception antenna 213, the control unit 201 controls the second matching circuit 214 so that the resonance frequency of the second power reception antenna 213 matches the second frequency. If the second matching circuit 214 sets the resonance frequency of the second power reception antenna 213 so that the resonance frequency matches the second frequency, the power received via the second power reception antenna 213 is supplied to the second rectifier and smoothing circuit 215 via the second matching circuit 214.

The second rectifier and smoothing circuit 215 generates DC power from the power supplied from the second matching circuit 214. In addition, the second rectifier and smoothing circuit 215 supplies the generated DC power to the regulator 207.

The second communication unit 216 transmits the third predetermined data via the second power reception antenna 213. In addition, the second communication unit 216 receives the third response data via the second power reception antenna 213. The third predetermined data is data defined by the Qi standard. In addition, the third response data is data defined by the Qi standard. The second communication unit 216 performs wireless communication with the power supply apparatus 100 based on the Qi standard.

The regulator 207 of the electronic apparatus 200 in FIG. 7 can supply the power supplied from the second rectifier and smoothing circuit 215 to the electronic apparatus 200. In addition, the regulator 207 can supply the power supplied from the second rectifier and smoothing circuit 215 to the electronic apparatus 200, in accordance with an instruction from the control unit 201.

<Second Power Supply Process>

Next, second power supply process performed by the power supply apparatus 100 according to the first exemplary embodiment will be described with reference to a flowchart in FIG. 8. The power supply apparatus 100 can perform the second power supply process by causing the control unit 101 to execute a computer program stored in the memory 117.

Figure 8:
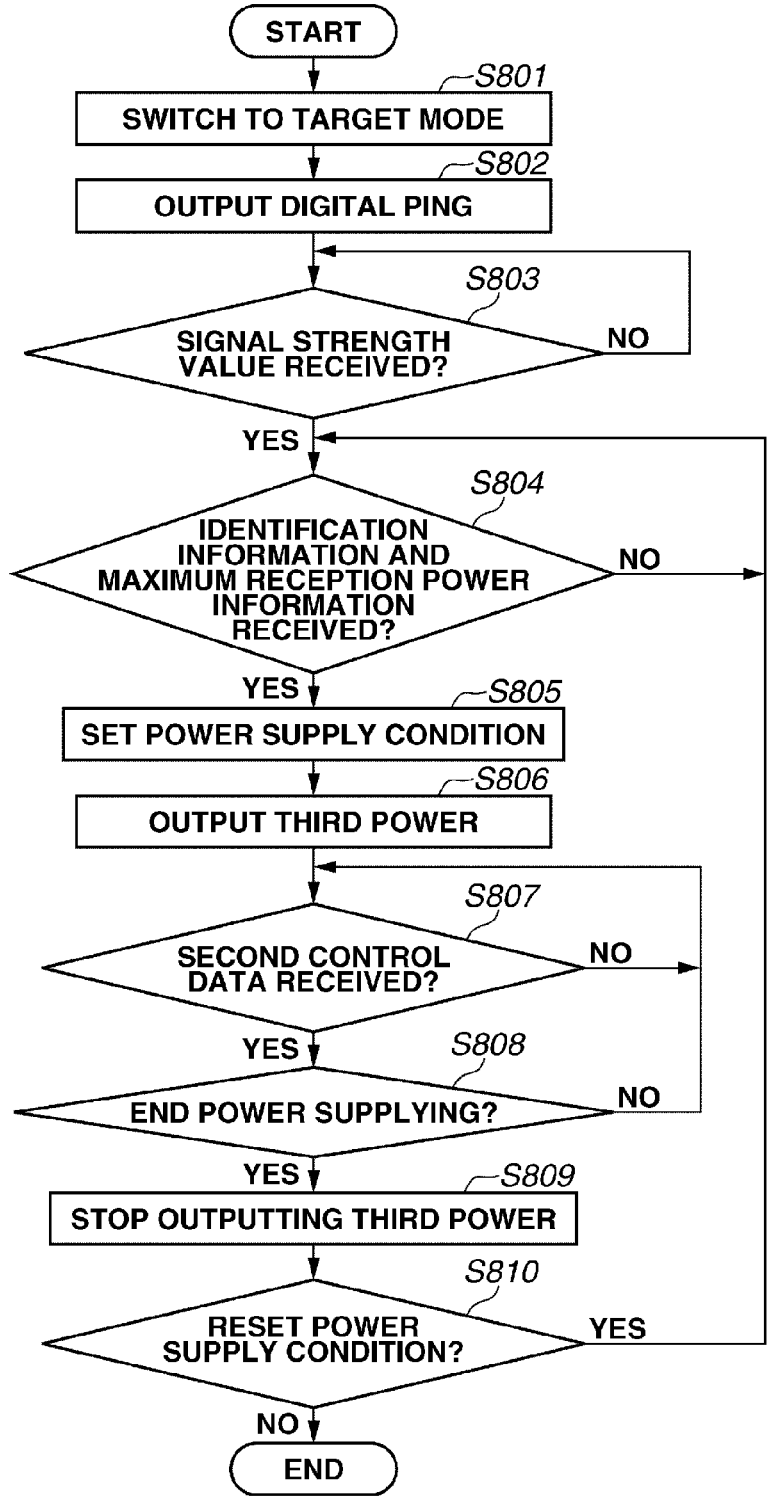
FIG. 8 is a flowchart illustrating an example of second power supply process performed by the power supply apparatus 100 according to the first exemplary embodiment.

When set in the second mode, the power supply apparatus 100 performs the second power supply process illustrated in FIG. 8.

When the power supply apparatus 100 performs the second power supply process in FIG. 8, the control unit 101 controls the second matching circuit 114 so that the resonance frequency of the second power supply antenna 116 is set to the second frequency. In addition, the control unit 101 controls the first matching circuit 107 so that the resonance frequency of the first power supply antenna 109 is set to 13.56 MHz. Alternatively, in this case, the control unit 101 may control the electronic apparatus 200 so that the resonance frequency of the first power reception antenna 203 is set to 13.56 MHz. Alternatively, in this case, the control unit 101 may set the electronic apparatus 200 so that the resonance frequency of the second power reception antenna 213 is set to the second frequency. The following description will be made assuming that, when the second power supply process in FIG. 8 is performed, the second power is not output via the first power supply antenna 109.

In step S801, the control unit 101 controls the first communication unit 108 to be in the target mode. In this case, the control unit 101 may control the first communication unit 206 of the electronic apparatus 200 to be in the initiator mode. Next, the process proceeds from step S801 to step S802.

In step S802, the control unit 101 controls the second detection unit 113 to output a digital ping via the second power supply antenna 116. Next, the process proceeds from step S802 to step S803.

In step S803, the control unit 101 determines whether the first communication unit 108 has received a "Signal Strength Value" via the first power supply antenna 109. The "Signal Strength Value" is a value defined by the Qi standard.

For example, the "Signal Strength Value" includes information about power received by the electronic apparatus 200 via the second power reception antenna 213 or information about a voltage rectified by the electronic apparatus 200. The "Signal Strength Value" includes information detected by the electronic apparatus 200 when the power supply apparatus 100 outputs a digital ping.

If the control unit 101 determines that the first communication unit 108 has received the "Signal Strength Value" (YES in step S803), the process proceeds from step S803 to step S804. If the control unit 101 determines that the first communication unit 108 has not received the "Signal Strength Value" (NO in step S803), the control unit 101 waits until the first communication unit 108 receives the "Signal Strength Value".

In step S804, the control unit 101 determines whether the first communication unit 108 has received identification information and maximum reception power information about the electronic apparatus 200 via the first power supply antenna 109. The identification information about the electronic apparatus 200 includes information about a manufacturer of the electronic apparatus 200 and information about an ID of the electronic apparatus 200. The maximum reception power information about the electronic apparatus 200 includes information about a maximum value of the power that the electronic apparatus 200 can receive via the second power reception antenna 213.

If the control unit 101 determines that the first communication unit 108 has received the identification information and the maximum reception power information about the electronic apparatus 200 (YES in step S804), the process proceeds from step S804 to step S805. If the control unit 101 determine that the first communication unit 108 has not received at least any one of the identification information and the maximum reception power information about the electronic apparatus 200 (NO in step S804), the control unit 101 waits until the first communication unit 108 receives the identification information and the maximum reception power information about the electronic apparatus 200 (i.e., repeats the process in step S804).

In step S805, the control unit 101 uses the maximum reception power information about the electronic apparatus 200 received in step S804 and sets a power supply condition relating to power supplying to the electronic apparatus 200.

For example, in step S805, the control unit 101 uses the maximum reception power information about the electronic apparatus 200 and sets a value of the power supplied from the power supply apparatus 100 to the electronic apparatus 200. Alternatively, in step S805, the control unit 101 may use the maximum reception power information about the electronic apparatus 200 and determine a maximum value of the power output from the power supply apparatus 100 to the electronic apparatus 200.

After the control unit 101 sets the power supply condition, the processing proceeds from step S805 to step S806.

In step S806, the control unit 101 controls the second power supply unit 110 to output the third power via the second power supply antenna 116, based on the power supply condition set in step S805. Next, the process proceeds from step S806 to step S807.

In step S807, the control unit 101 determines whether the first communication unit 108 has received the second control data from the electronic apparatus 200 via the first power supply antenna 109. The second control data includes information for controlling power supplying. The second control data is used for controlling power supplying to the electronic apparatus 200.

The second control data may include information indicating an error, for example. In addition, the second control data may include information about a value of the power received by the electronic apparatus 200 via the second power reception antenna 213, for example. The second control data may include information about the remaining capacity of the battery 209 connected to the electronic apparatus 200, for example. The second control data may include information for requesting stopping of the power supplying to the power supply apparatus 100, for example. The second control data may include information indicating a reason for requesting stopping of the power supplying, for example. The second control data may include information about a request for resetting the power supply condition. The second control data may include information indicating that the battery 209 is fully charged.

If the control unit 101 determines that the first communication unit 108 has received the second control data (YES in step S807), the process proceeds from step S807 to step S808. If the control unit 101 determines that the first communication unit 108 has not received the second control data (NO in step S807), the control unit 101 waits until the first communication unit 108 receives the second control data (i.e., repeats the process in step S807). If the first communication unit 108 has received the second control data (YES in S807), the control unit 101 controls the second power supply unit 110 based on the received second control data.

In step S808, the control unit 101 determines whether to end the power supplying. For example, if the first communication unit 108 receives information indicating an error, the control unit 101 determines that the power supplying needs to be ended. In addition, for example, if the first communication unit 108 receives information for requesting the power supply apparatus 100 to stop the power supplying, the control unit 101 determines that the power supplying needs to be ended. In addition, for example, if the first communication unit 115 does not receive the second control data even after a predetermined time elapses, the control unit 101 determines that the power supplying needs to be ended. If the first communication unit 108 receives the second control data within the predetermined time, the control unit 101 determines that the power supplying needs to be continued.

If the control unit 101 determines that the power supplying needs to be ended (YES in step S808), the process proceeds from step S808 to step S809. If the control unit 101 determines that the power supplying needs to be continued (NO in step S808), the process returns from step S808 to step S807.

In step S809, the control unit 101 controls the second power supply unit 110 to stop outputting the third power. Accordingly, outputting of the third power via the second power supply antenna 116 is stopped. Next, the process proceeds from step S809 to step S810.

In step S810, the control unit 101 determines whether to reset the power supply condition. For example, in step S810, the control unit 101 determines whether the first communication unit 108 has received information for requesting resetting of the power supply condition. If the control unit 101 determines that the first communication unit 108 has received information for requesting resetting of the power supply condition (YES in step S810), the control unit 101 determines that the power supply condition needs to be reset. If the control unit 101 determines that the first communication unit 108 has not received information for requesting resetting of the power supply condition (NO in step S810), the control unit 101 determines that the power supply condition is not to be reset.

If the control unit 101 determines that the power supply condition needs to be reset (YES in step S810), the process returns from step S810 to step S804. If the control unit 101 determines that the power supply condition is not to be reset (NO in step S810), the control unit 101 ends the process.

<Third Power Supply Process>

Next, third power supply process performed by the power supply apparatus 100 according to the first exemplary embodiment will be described with reference to a flowchart in FIG. 9. The power supply apparatus 100 can perform the third power supply process by causing the control unit 101 to execute a computer program stored in the memory 117.

Figure 9:
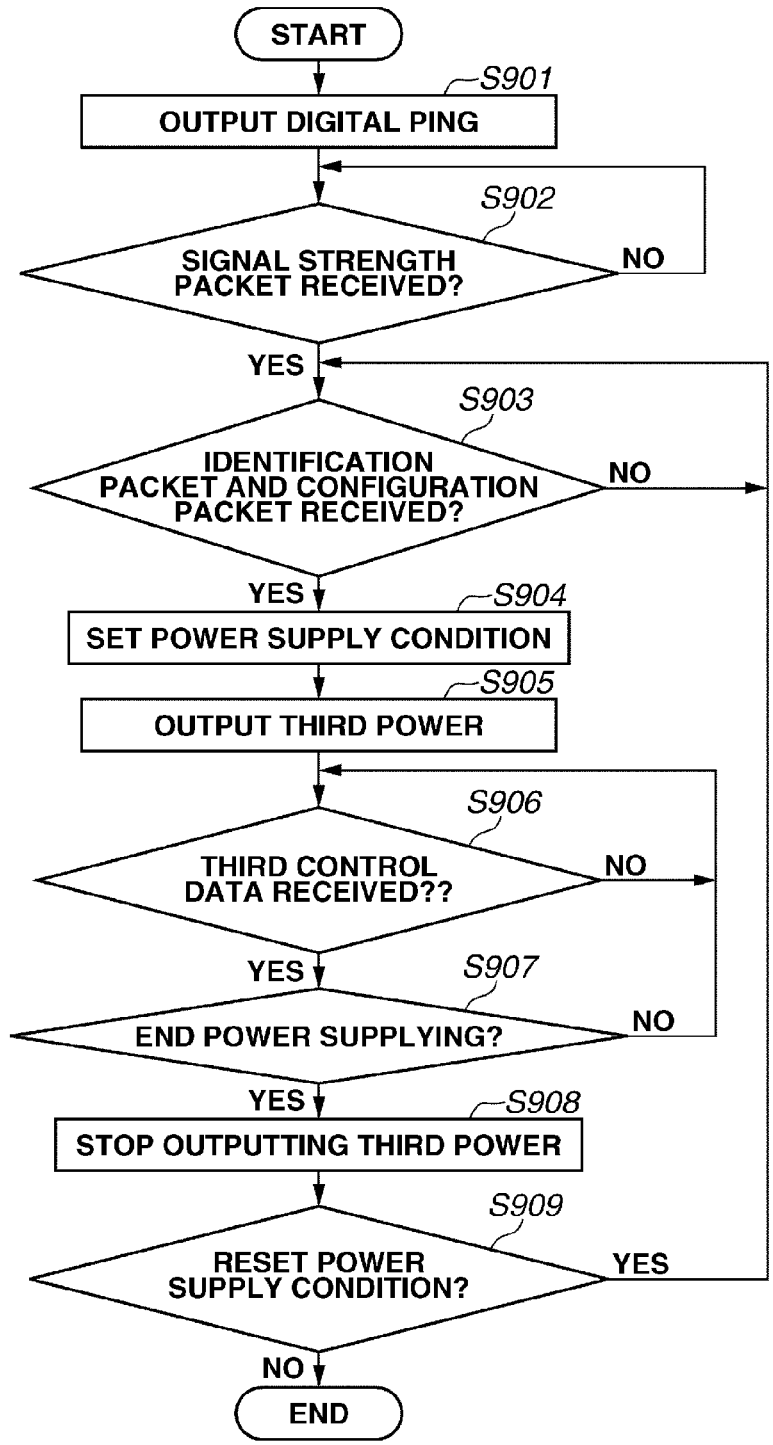
FIG. 9 is a flowchart illustrating an example of third power supply process performed by the power supply apparatus 100 according to the first exemplary embodiment.

When set in the third mode, the power supply apparatus 100 performs the third power supply process illustrated in FIG. 9. When the power supply apparatus 100 performs the third power supply process in FIG. 9, the control unit 101 controls the second matching circuit 114 so that the resonance frequency of the second power supply antenna 116 is set to the second frequency. Alternatively, in this case, the control unit 101 may control the electronic apparatus 200 so that the resonance frequency of the second power reception antenna 213 is set to the second frequency. The following description will be made assuming that, when the third power supply process in FIG. 9 is performed, the first power and the second power are not output via the first power supply antenna 109.

The control unit 101 controls the second detection unit 113 to perform the selection process. After the selection process, if the electronic apparatus 200 is detected near the power supply apparatus 100, the control unit 101 performs step S901.

In step S901, the control unit 101 controls the second detection unit 113 to output a digital ping via the second power supply antenna 116. Next, the process proceeds from step S901 to step S902.

If the electronic apparatus 200 detects the digital ping, the second communication unit 115 transmits a "Signal Strength packet" via the second power reception antenna 213. The second communication unit 216 transmits the "Signal Strength packet" as a reply to the digital ping. The "Signal Strength packet" includes the "Signal Strength Value" and is a packet defined by the Qi standard.

In step S902, the control unit 101 determines whether the second communication unit 115 has received the "Signal Strength packet" via the second power supply antenna 116.

If the control unit 101 determines that the second communication unit 115 has received the "Signal Strength packet" (YES in step S902), the process proceeds from step S902 to step S903. If the control unit 101 determines that the second communication unit 115 has not received the "Signal Strength packet" (NO in step S902), the control unit 101 waits until the second communication unit 115 receives the "Signal Strength packet" (i.e., repeats the process in step S902).

Next, in step S903, the control unit 101 determines whether the second communication unit 115 has received an "Identification packet" and a "Configuration packet" via the second power supply antenna 116. The "Identification packet" includes the identification information about the electronic apparatus 200, and the "Configuration packet" includes the maximum reception power information about the electronic apparatus 200. The "Identification packet" and "Configuration packet" are packets defined by the Qi standard.

If the control unit 101 determines that the second communication unit 115 has received the "Identification packet" and the "Configuration packet" (YES in step S903), the process proceeds from step S903 to step S904. If the control unit 101 determines that the second communication unit 115 has not received any one of the "Identification packet" and the "Configuration packet" (NO in step S903), the control unit 101 waits until the second communication unit 115 receives the "Identification packet" and the "Configuration packet" (i.e., repeats the process in step S903).

If the second communication unit 115 has received the "Identification packet" and the "Configuration packet" (YES in step S903), the control unit 101 may control the second detection unit 113 to stop outputting the digital ping.

In step S904, the control unit 101 uses the "Configuration packet" received in step S903 and sets a power supply condition (power transfer contract) relating to the power supplying to the electronic apparatus 200. For example, in step S904, the control unit 101 uses the maximum reception power information about the electronic apparatus 200 and sets a value of the power supplied from the power supply apparatus 100 to the electronic apparatus 200. Alternatively, in step S904, the control unit 101 may use the maximum reception power information about the electronic apparatus 200 to determine a maximum value of the power output from the power supply apparatus 100 to the electronic apparatus 200. After the control unit 101 sets the power supply condition, the process proceeds from step S904 to step S905.

In step S905, the control unit 101 controls the second power supply unit 110 to output the third power via the second power supply antenna 116 based on the power supply condition set in step S904. Next, the process proceeds from step S905 to step S906.

In step S906, the control unit 101 determines whether the second communication unit 115 has receives the third control data via the second power supply antenna 116. The third control data includes information for controlling power supplying.

For example, the third control data is at least one of a "Control Error packet", a "Received Power packet", a "Charge Status packet", and an "End Power Transfer packet". The "Control Error packet" includes information indicating an error. The "Received Power packet" includes information indicating a value of the power received by the electronic apparatus 200 via the second power reception antenna 213. The "Charge Status packet" includes information about the remaining capacity of the battery 209 connected to the electronic apparatus 200. The "End Power Transfer packet" includes information for requesting the power supply apparatus 100 to stop the power supplying to the electronic apparatus 200. In addition, the "End Power Transfer packet" includes information indicating a reason for requesting stopping of the power supplying. The information indicating a reason for requesting stopping of the power supplying is information for requesting resetting of the power supply condition, for example. In addition, the information indicating a reason for requesting stopping of the power supplying is information indicating that the battery 209 is fully charged, for example. The "Control Error packet", the "Received Power packet", the "Charge Status packet", and the "End Power Transfer packet" are packets defined by the Qi standard.

If the control unit 101 determines that the second communication unit 115 has received the third control data (YES in step S906), the process proceeds from step S906 to step S907. If the control unit 101 determines that the second communication unit 115 has not received the third control data (NO in step S906), the control unit 101 waits until the second communication unit 115 receives the third control data (i.e., repeats the process in step S906). If the control unit 101 determines that the second communication unit 115 has received the third control data (YES in step S906), the control unit 101 controls the second power supply unit 110 based on the received third control data.

In step S907, the control unit 101 determines whether to end the power supplying. For example, if the second communication unit 115 receives the "Control Error packet" or the "End Power Transfer packet", the control unit 101 determines that the power supplying needs to be ended. For example, if the second communication unit 115 does not receive the third control data even after a predetermined time elapses, the control unit 101 determines that the power supplying needs to be ended. If the second communication unit 115 receives the third control data within the predetermined time, the control unit 101 determines that the power supplying needs to be continued. For example, if the second communication unit 115 does not receive at least any one of the "Control Error packet" and the "End Power Transfer packet", the control unit 101 determines that the power supplying needs to be continued.

If the control unit 101 determines that the power supplying needs to be ended (YES in step S907), the process proceeds from step S907 to step S908. If the control unit 101 determines that the power supplying needs to be continued (NO in step S907), the process returns from step S907 to step S906.

In step S908, the control unit 101 controls the second power supply unit 110 to stop outputting the third power. Accordingly, outputting of the third power via the second power supply antenna 116 is stopped. Next, the process proceeds from step S907 to step S908.

In step S909, the control unit 101 determines whether to reset the power supply condition. For example, in step S909, the control unit 101 determines whether the second communication unit 115 has received information for requesting resetting of the power supply condition. If the control unit 101 determines that the second communication unit 115 has received information for requesting resetting of the power supply condition, the control unit 101 determines that the power supply condition needs to be reset. If the control unit 101 determines that the second communication unit 115 has not received information for requesting resetting of the power supply condition, the control unit 101 determines that the power supply condition is not to be reset.

If the control unit 101 determines that the power supply condition needs to be reset (YES in step S909), the process returns from step S909 to step S903. If the control unit 101 determines that the power supply condition is not to be reset (NO in step S909), the control unit 101 ends the process.

As described above, if the power supply apparatus 100 according to the first exemplary embodiment is compatible with a plurality of power supply methods, a power supply method for supplying power to the electronic apparatus 200 can be selected based on authentication with the electronic apparatus 200. In addition, if the power supply apparatus 100 according to the first exemplary embodiment is compatible with a plurality of control methods, a control method for supplying power to the electronic apparatus 200 can be selected based on authentication with the electronic apparatus 200.

In this way, the power supply apparatus 100 can determine whether the electronic apparatus 200 is compatible with the first or second power supply method. In addition, the power supply apparatus 100 can determine whether the electronic apparatus 200 is compatible with the first or second control method. After determining a power supply method with which the electronic apparatus 200 is compatible, the power supply apparatus 100 selects the power supply method for supplying power to the electronic apparatus 200. In addition, after determining a control method with which the electronic apparatus 200 is compatible, the power supply apparatus 100 selects the control method for supplying power to the electronic apparatus 200.

Thus, the power supply apparatus 100 can select a power supply method and a control method suitable for the electronic apparatus 200 and can perform power supplying to the electronic apparatus 200 based on the selected power supply method and control method.

The control unit 101 performs steps S501 to S504 of the authentication process in FIG. 5 by using the first power supply unit 103, without using the second power supply unit 110. In addition, in this case, if the first communication unit 108 is in the reader/writer mode, the control unit 101 performs steps S501 to S504 of the authentication process in FIG. 5.

This is because the first power supply unit 103 is more suitable for long-distance communication than the second power supply unit 110. In addition, the first power supply unit 103 is more suitable for long-distance power supplying than the second power supply unit 110.

Thus, even if the distance between the power supply apparatus 100 and the electronic apparatus 200 is long, the control unit 101 can detect the electronic apparatus 200 by using the first power supply unit 103 and can perform authentication with the electronic apparatus 200 by using the first power supply unit 103.

In addition, when the power supply apparatus 100 performs authentication with the electronic apparatus 200 by using the second power supply unit 110, the electronic apparatus 200 needs to transmit data for authentication to the power supply apparatus 100. Thus, if the battery 209 does not have a sufficient remaining capacity for communication with the power supply apparatus 100, the electronic apparatus 200 cannot perform authentication with the power supply apparatus 100. As a result, the electronic apparatus 200 cannot receive power from the power supply apparatus 100.

To avoid this situation, if the first communication unit 108 is in the reader/writer mode, the control unit 101 performs steps S501 to S504 of the authentication process in FIG. 5. If the first communication unit 108 is in the reader/writer mode, the electronic apparatus 200 can communicate with the power supply apparatus 100 by using the first power supplied from the power supply apparatus 100. Thus, even if the battery 209 does not have a sufficient remaining capacity to communicate with the power supply apparatus 100, the electronic apparatus 200 can perform authentication with the power supply apparatus 100.

In the above description, the first communication unit 108 has the reader/writer mode as a communication mode. However, the first communication unit 108 may have the initiator mode, instead of the reader/writer mode. In such a case, the process and operations performed by the first communication unit 108 in the reader/writer mode are performed by the first communication unit 108 in the initiator mode.

In the above description, the first communication unit 206 has the card emulation mode as a communication mode. However, the first communication unit 206 may have the target mode, instead of the card emulation mode. In such a case, the process and operations performed by the first communication unit 206 in the card emulation mode are performed by the first communication unit 206 in the target mode.

Other Exemplary Embodiments

The power supply apparatus according to the present invention is not limited to the power supply apparatus 100 according to the first exemplary embodiment. For example, a power supply apparatus according to the present invention can be realized by a system including a plurality of apparatuses.

In addition, various kinds of processing and functions described in the first exemplary embodiment can be realized by a computer program. In such a case, the computer program can execute the processing according to the present invention and realize various functions described in the first exemplary embodiment.

The computer program according to the present invention may realize various kinds of processing and functions described in the first exemplary embodiment by using an operating system (OS) and the like operating on the computer.

The computer program according to the present invention is read from a computer readable recording medium and is executed by a computer. Examples of the computer readable recording medium include a hard disk device, an optical disk, a compact disk read only memory (CD-ROM), a compact disk recordable (CD-R), a memory card, and a ROM. In addition, the computer program according to the present invention may be provided from an external apparatus to a computer via a communication interface and be executed by the computer.

The present invention is not limited to the above exemplary embodiment. Various modifications and variations can be made to the above exemplary embodiment without departing from the spirit and the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222902, filed Oct. 5, 2012, which is hereby incorporated by reference herein in its entirety.

The invention claimed is:

1. A power supply apparatus comprising: a first power supply unit configured to be used for a first power supply method; a second power supply unit configured to be used for a second power supply method different from the first power supply method; a first communication unit configured to be used for a first control method for controlling power supplying; a second communication unit configured to be used for a second control method different from the first control method; and a control unit configured to set the power supply apparatus in any one of a first mode, a second mode, and a third mode based on authentication with an electronic apparatus; wherein the control unit operates so that the power supply apparatus performs power supply to the electronic apparatus based on a set mode, wherein the first mode is a mode for performing power supplying based on the first power supply method and for controlling power supplying based on the first control method, wherein the second mode is a mode for performing power supplying based on the second power supply method and for controlling power supplying based on the first control method, and wherein the third mode is a mode for performing power supplying based on the second power supply method and for controlling power supplying based on the second control method.

2. The power supply apparatus according to claim 1, wherein the first power supply method is a method for supplying power based on a first frequency, and the second power supply method is a method for supplying power based on a second frequency different from the first frequency.

3. The power supply apparatus according to claim 2, wherein the first frequency is a frequency higher than the second frequency.

4. The power supply apparatus according to claim 2, wherein the first frequency is a frequency defined by a Near Field Communication (NFC) standard.

5. The power supply apparatus according to claim 2, wherein the second frequency is a frequency defined by a Qi standard.

6. The power supply apparatus according to claim 1, wherein the first power supply method is a method for supplying power by using magnetic resonance.

7. The power supply apparatus according to claim 1, wherein the second power supply method is a method for supplying power by using electromagnetic induction.

8. The power supply apparatus according to claim 1, wherein the first control method is a method for performing communication for controlling power supplying based on a first frequency, and the second power supply method is a method for performing communication for controlling power supplying based on a second frequency different from the first frequency.

9. The power supply apparatus according to claim 8, wherein the first frequency is a frequency higher than the second frequency.

10. The power supply apparatus according to claim 8, wherein the first frequency is a frequency defined by a Near Field Communication (NFC) standard.

11. The power supply apparatus according to claim 8, wherein the second frequency is a frequency defined by a Qi standard.

12. The power supply apparatus according to claim 1, wherein, before transmitting power, the first communication unit superimposes data for controlling power supplying on the power.

13. The power supply apparatus according to claim 1, wherein the first communication unit transmits data for controlling power supplying based on ASK modulation.

14. The power supply apparatus according to claim 1, wherein the first communication unit operates as a reader/writer.

15. The power supply apparatus according to claim 1, wherein the first communication unit operates as a peer-to-peer target.

16. The power supply apparatus according to claim 1, wherein the control unit performs authentication with the electronic apparatus by using the first communication unit.

17. The power supply apparatus according to claim 1, wherein, if the control unit cannot perform authentication with the electronic apparatus, the control unit sets the power supply apparatus in the third mode.

18. A control method for controlling the power supply apparatus according to claim 1.

19. A non-transitory computer readable storage medium for storing a computer program for realizing a power supply apparatus, the power supply apparatus comprising:
a first power supply unit configured to be used for a first power supply method;
a second power supply unit configured to be used for a second power supply method different from the first power supply method;
a first communication unit configured to be used for a first control method for controlling power supplying;
a second communication unit configured to be used for a second control method different from the first control method; and
a control unit configured to set the power supply apparatus in any one of a first mode, a second mode, and a third mode based on authentication with an electronic apparatus;

wherein the control unit operates so that the power supply apparatus performs power supply to the electronic apparatus based on a set mode,
wherein the first mode is a mode for performing power supplying based on the first power supply method and for controlling power supplying based on the first control method,
wherein the second mode is a mode for performing power supplying based on the second power supply method and for controlling power supplying based on the first control method, and
wherein the third mode is a mode for performing power supplying based on the second power supply method and for controlling power supplying based on the second control method.

* * * * *